Nov. 9, 1937.　　　　F. A. LUTHY　　　　2,098,902

PISTON RING

Filed Nov. 12, 1936

Inventor
FREDRICK A. LUTHY

By Beaman & Langford
Attorney

Patented Nov. 9, 1937

2,098,902

UNITED STATES PATENT OFFICE 2,098,902

PISTON RING

Fredrick A. Luthy, Jackson, Mich.

Application November 12, 1936, Serial No. 110,447

1 Claim. (Cl. 309—27)

The present invention relates to improvements in piston rings for internal combustion engines and the like. In the patented art numerous proposals appear for expanding and sealing piston rings in the ring grooves defined in the piston wall. For the most part it has been the practice in the past to employ radially expanding means which act upon the outer ring section engaging with the cylinder wall. In most cases the expanding means acts indirectly upon the outer ring section through a sealing ring section or sections. To prevent the pressures of compression and explosion passing around the piston ring by leaking back of the same through the piston groove, the contacting surfaces between the outer ring section and the sealing ring section or sections has been so shaped as to result in movement axially of the piston. This axial movement has the purpose of bringing either or both the outer ring section and the sealing section into sealing contact with the sides of the ring groove defined in the piston wall. Reference may be had to U. S. Patents No. 961,373 and No. 1,359,596 as being typical of prior constructions.

At the present time reduction in the size of pistons, piston rings, and depth of ring grooves used in internal combustion engines of automobiles has had the effect of making most prior proposals obsolete due to the lack of available space within which to assemble the expanding and sealing structures heretofore proposed or lack of adequate strength when sufficiently reduced in dimension to be assembled in position back of the outer ring section. Moreover, if it were possible to assemble the reduced parts in the grooves the construction, in its reduced form, would be too weak to stand up in use and it would readily break up under present day high speeds and high compression ratios. This will be apparent from the fact that the majority of piston rings now in use vary from $\frac{3}{32}''$ to $\frac{3}{16}''$ in width and average about $\frac{3}{32}''$ in depth, with the depth of the ring grooves as measured inwardly from the face of the piston being in the neighborhood of $\frac{5}{32}''$. In other words, the sealing and expanding structure to be assembled back of or otherwise associated with the outer ring section of the piston ring along with the outer ring section itself must all be assembled in and function properly within a space of approximately $\frac{5}{32}''$. With the outer ring section having the dimensions aforesaid it becomes apparent that it is no longer feasible to construct the outer ring section in the manner proposed in the patents above mentioned for the reason that the outer ring section would be too fragile and excessive breakage would result in installation and the lack of adequate strength would result in the outer ring sections breaking up under present day engine operation. At the same time excessive wear of the piston ring would result due to a tendency for the outer section to cock, shift and twist in the ring groove upon reciprocation of the piston. As is well recognized such action of the ring within the groove results in rounding the corners of the ring and materially reduces its effectiveness for the purpose designed.

Thus it becomes an object of the present invention to provide a multipart piston ring which is of a design enabling the principles of the invention to be utilized in connection with relatively small pistons and narrow piston rings. The cross-section of the outer ring section contacting with the cylinder wall has been maintained to closely conform to the ring groove in which it is positioned to provide adequate seat portions engaging with the sides of the ring groove so as to prevent any tendency toward cocking or rocking of the outer ring section in its groove. The stability of the outer ring section in position has been increased by the relationship between the sealing member and the expanding structure assembled between the outer ring section and the bottom of the ring groove. The sealing ring compared with the outer ring section is relatively small and depends upon its movement axially of the piston under the stress of the expanding means by the camming action afforded by a chamfered corner of the outer ring. The expanding structure for the sealing ring and outer ring may take numerous shapes and preferably has the sealing ring attached along one edge thereof and is sufficiently wide as compared with the width of the ring groove so as to resist any tendency for the sealing ring to cock or rock within the groove. Preferably, the sealing ring is of a light wire of suitable cross-section and capable of being expanded at the time of installation without permanent distortion or breakage.

In the drawing where several forms of the present invention are disclosed

Figure 1:
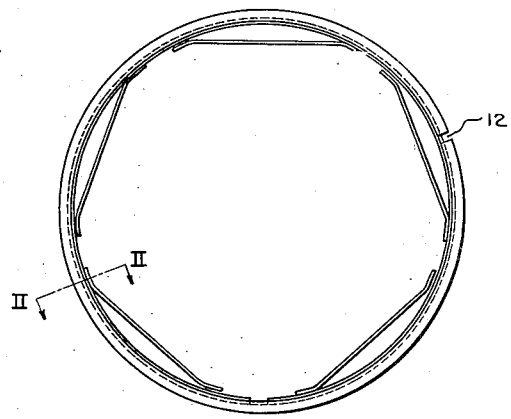
Fig. 1 is a plan view of several parts of the piston ring as they appear when assembled.
Figure 2:
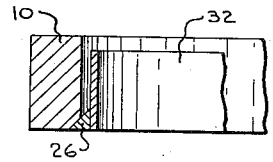
Fig. 2 is a cross-sectional view taken on the line II—II of Fig. 1.
Figure 4:
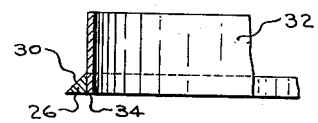
Fig. 4 is a cross-sectional view taken on line IV—IV of Fig. 3.
Figure 3:
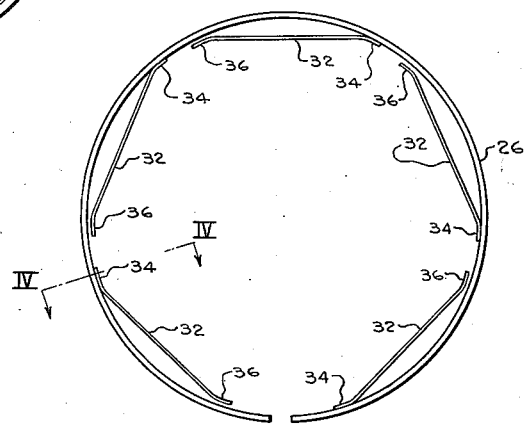
Fig. 3 is a view similar to Fig. 1 of the sealing ring and associated expanding spring members.
Figure 5:
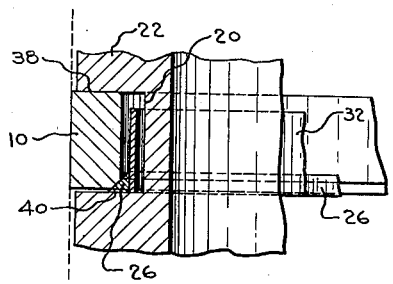
Fig. 5 is a fragmentary cross-sectional view taken through the piston and piston ring showing the sealing action of the piston ring within the groove.
Figure 6:
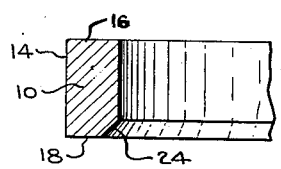
Fig. 6 is a cross-sectional view of the outer ring section.

Referring to the drawing I have illustrated the principles of the invention in connection with a multipart piston ring assembly comprising an outer ring section 10 which may be split as at 12. As more clearly shown in Fig. 6 the ring section 10 has an outer face 14 which contacts the cylinder wall and upper and lower faces 16 and 18, the face 18 preferably being of substantial extent as compared with the depth of the ring 10 so as to provide the section 10 with substantial upper and lower bearing surfaces to be presented to the side walls of the piston groove 20. By having these substantial bearing surfaces any tendency for the outer ring to rock or cock in the groove 20 upon reciprocation of the piston 22 is materially reduced as compared with the case of an outer ring section substantially triangular in cross-section as disclosed in the aforesaid patents. It is to be understood that in commercial practice the axial dimension of the section 10 may not exceed 3/32" and the radial width may be of similar dimension or even less. With this size ring the radial dimension of the groove 20 shown in Fig. 5 in commercial practice would be in the neighborhood of 3/32". It is to be understood, however, that the dimensions herein given are merely for the purpose of bringing out the features of the invention and its particular field of application without in any way restricting the field of useful application of the invention to piston rings of any particular size. As shown in Fig. 6 an inner corner of the outer ring section 10 is shown chamfered at 24. The extent of the chamfer will depend upon the dimensions of the outer ring section and may be increased over the proportions shown in Fig. 6. In Figs. 3 and 4 the sealing ring 26 takes the form of a split wire ring which is shown as being triangular in cross section with the hypotenuse 30 substantially complementary with the chamfer 24 of the ring section 10. The sealing ring 26 has attached thereto a plurality of flat spring members 32 of substantially greater width than the sealing ring 26 and preferably as shown in Fig. 5 may be of a width approaching that of the groove 20. However, in applying the principles of the invention to an oil ring this dimension is held somewhat less than the ring groove so as to permit adequate clearance for the passage of oil about the spring members. The members 32 are each fixed at one edge of the sealing ring 26 as at 34. The opposite ends 36 of the members 32 are free from the sealing ring 26 and slide along in contact with the inner side thereof at the time the sealing ring is in assembled position between the bottom of the groove 20 and the ring section 10 which results in bowing a portion of the members 32, between the ends 34 and 36, radially outward imparting to the sealing ring 26 an expanding action in a manner well understood.

The expanding action of the ring 26 due to the spring members 32 when in assembled position as shown in Fig. 5 will result in the outer ring section 10 being urged radially and axially to seal one side of the groove as at 38 and at the same time the sealing member 26 will be urged axially and radially into sealing engagement with the groove 20 as at 40. As will be well understood the axial movement of the spring sections 10 and 26 results from the inclination of the chamfered corner 24 and the surface 30. Because of the width of the members 32 as compared with the ring 26 and the flatness of their construction the members 32 act to restrain any tendency for the sealing ring 26 to cock or rock in the groove and thus function to maintain the outer section 10 in a non-cocking and non-rocking position within the groove 20. With such an arrangement even in the case of relatively narrow piston rings effective sealing may be accomplished and stability of the ring within its groove maintained in operation.

Figure 7:
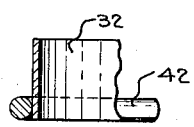
Fig. 7 is a view similar to Fig. 4 of a slightly modified type of sealing ring.

In Fig. 7 the sealing member 42 is formed of a wire of circular cross-section and it is thought that it will be readily apparent to those skilled in the art that this construction will be equally effective when used in connection with the inclined surface of the outer sealing section to impart axial movement to the outer and sealing ring sections.

Figure 8:
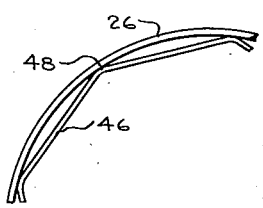
Fig. 8 is a view similar to Fig. 3 showing a different type of expanding member used in connection with the sealing ring section.

It is to be understood that expanding means of other than the construction of the members 32 may be used in connection with the sealing ring section. In Fig. 8 the sealing ring section 26 is shown in combination with a polygonal-shaped spring 46 of the type shown in U. S. Patent No. 1,576,402. If desired the spring 46 may be welded to the ring section 26 at one point such as at 48 or the spring and sealing ring section may be loosely associated. In most cases the width of the spring 46 will compare with that of the spring member 32. Many other well known types of expander springs disclosed in the patented art and being used commercially may be satisfactorily used in combination with outer and sealing ring sections of the construction herein disclosed.

In commercial production the outer ring section 10 will be of cast iron which is relatively fragile and should be maintained of maximum cross-sectional area to reduce breakage at the time of installation and under operation to a minimum. The sealing ring 26 which is relatively small in cross-sectional area as compared with the outer ring section 10 is made from bendable and/or highly resilient wire stock which assures the installation of the sealing ring in the ring groove without any possible breakage and for similar reasons obviates any possibility of breakage during use.

Having thus described my invention what I desire to protect by Letters Patent and claim is:

A multipart piston ring comprising an outer ring generally rectangular in cross-section and having an inner edge thereof chamfered to provide a face inclined to the axis of said outer ring, a sealing ring in the form of a relatively small wire, a relatively flat expanding spring member of substantially greater longitudinal dimension than said sealing ring and approximating the longitudinal dimension of said outer ring, said sealing ring being fixed to said spring member along one edge thereof and adapted to be positioned thereby for engagement with said chamfered edge.

FREDRICK A. LUTHY.